(12) United States Patent
Joki et al.

(10) Patent No.: US 9,777,767 B2
(45) Date of Patent: Oct. 3, 2017

(54) RELIEF CONTOUR FOR A ROLLER BEARING

(71) Applicant: The Timken Company, North Canton, OH (US)

(72) Inventors: Mark A. Joki, Dover, OH (US); Young Sup Kang, Massillon, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 14/905,334

(22) PCT Filed: May 14, 2014

(86) PCT No.: PCT/US2014/037948
§ 371 (c)(1),
(2) Date: Jan. 15, 2016

(87) PCT Pub. No.: WO2015/009347
PCT Pub. Date: Jan. 22, 2015

(65) Prior Publication Data
US 2016/0160914 A1 Jun. 9, 2016

Related U.S. Application Data

(60) Provisional application No. 61/856,209, filed on Jul. 19, 2013.

(51) Int. Cl.
*F16C 33/34* (2006.01)
*F16C 23/08* (2006.01)
(Continued)

(52) U.S. Cl.
CPC ............ *F16C 23/088* (2013.01); *F16C 19/26* (2013.01); *F16C 33/34* (2013.01); *F16C 33/36* (2013.01);
(Continued)

(58) Field of Classification Search
CPC ........ F16C 19/26; F16C 23/088; F16C 33/34; F16C 33/36; F16C 33/585; F16C 2240/50; F16C 2240/70
(Continued)

(56) References Cited

U.S. PATENT DOCUMENTS 1,044,850 A * 11/1912 Beaton .................... F16C 33/36
248/55
1,646,947 A * 10/1927 Armstrong ............ F16C 23/086
384/568
(Continued)

FOREIGN PATENT DOCUMENTS

| DE | 102008026340 | 12/2009 |
|---|---|---|
| DE | 102010020347 | 12/2010 |
| FR | 2892502 | 4/2007 |

OTHER PUBLICATIONS

International Search Report and Written Opinion for Application No. PCT/US2014/037948 dated Nov. 27, 2014 (13 pages).

*Primary Examiner* — James Pilkington
(74) *Attorney, Agent, or Firm* — Michael Best & Friedrich LLP

(57) ABSTRACT

A roller bearing includes an outer raceway, an inner raceway, and a roller positioned between the outer and inner raceways. The roller bearing also includes a relief contour between the roller and at least one of the outer and inner raceways. The relief contour defines a slope along its length. The slope of the relief contour defines at least one inflection region.

11 Claims, 3 Drawing Sheets

(51) Int. Cl.
*F16C 33/58* (2006.01)
*F16C 19/26* (2006.01)
*F16C 33/36* (2006.01)

(52) U.S. Cl.
CPC ........ *F16C 33/585* (2013.01); *F16C 2240/50* (2013.01); *F16C 2240/70* (2013.01)

(58) Field of Classification Search
USPC .................................................. 384/568, 569
See application file for complete search history.

(56) References Cited

U.S. PATENT DOCUMENTS

| | | | |
|---|---|---|---|
| 3,655,251 A | | 4/1972 | Evenson |
| 5,310,269 A | * | 5/1994 | Wardle .................... F16C 19/36 384/450 |
| 5,441,351 A | * | 8/1995 | Grunze ................ F16C 23/086 384/450 |
| 5,586,826 A | | 12/1996 | Kellstrom et al. |
| 5,902,022 A | | 5/1999 | Shattuck et al. |
| 6,227,711 B1 | * | 5/2001 | Kellstrom ............... F16C 33/36 384/450 |
| 6,390,685 B1 | * | 5/2002 | Shimomura ............ F16C 19/26 384/450 |
| 2007/0089495 A1 | | 4/2007 | Plona |

* cited by examiner

RELIEF CONTOUR FOR A ROLLER BEARING

FIELD OF THE INVENTION

The present invention relates to roller bearings, and more particularly to a roller bearing with modified geometry to control contact stress, extend bearing life, and improve efficiency.

BACKGROUND OF THE INVENTION

Roller bearings typically include a plurality of rollers disposed between an outer raceway and an inner raceway. Profiling of rollers and raceways is typically applied in the prior art. When a bearing is operated under both heavy loads and light loads, the optimum profile for reduced stresses with a heavy load is in conflict with the optimum profile for low power loss at light loads. This invention describes a profiling relief contour shape that minimizes the conflict of these opposing requirements.

SUMMARY OF THE INVENTION

The invention provides, in one aspect, a roller bearing including an outer raceway, an inner raceway, and a roller positioned between the outer and inner raceways. The roller bearing also includes a relief contour between the roller and at least one of the outer and inner raceways. The relief contour defines a slope along its length. The slope of the relief contour defines at least one inflection region.

The invention provides, in another aspect, a roller bearing including an outer raceway, an inner raceway, and a roller positioned between the outer and inner raceways. The roller bearing also includes a relief contour between the roller and at least one of the outer and inner raceways. The relief contour defines a slope along its length. The relief contour includes a first zone in which the slope increases in magnitude along a length of the first zone. The relief contour also includes a second zone adjacent the first zone in which the slope decreases in magnitude along at least a portion of a length of the second zone to define an inflection region between the first zone and the second zone.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following, description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
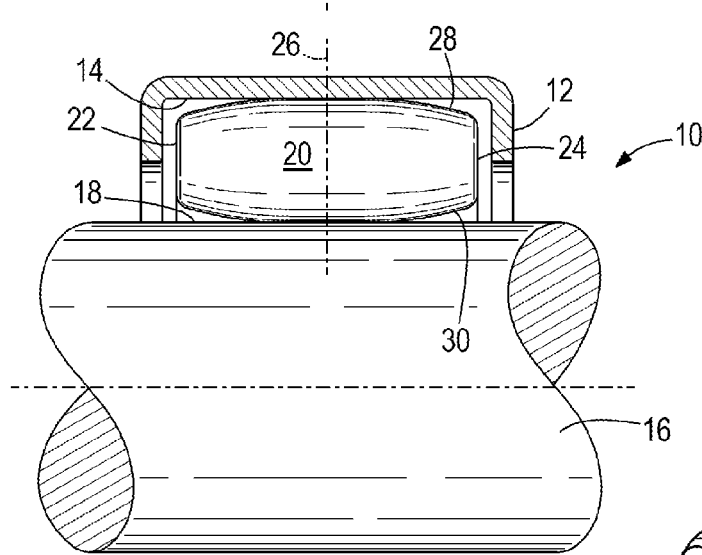
FIG. 1 is a cross-sectional view of a portion of a conventional roller hearing assembly.

FIG. 1 illustrates a portion of a conventional roller bearing assembly 10 having an outer ring 12 with an outer raceway 14, a shaft 16 with an inner raceway 18, and rollers 20 disposed between the outer and inner raceways 14, 18. In the illustrated embodiment, the inner raceway 18 is defined by a journaled portion of the shaft 16 such that the rollers 20 directly contact an exterior surface of the shaft 16. In other embodiments, the inner raceway 18 can include a separate track or other structure.

Figure 3:
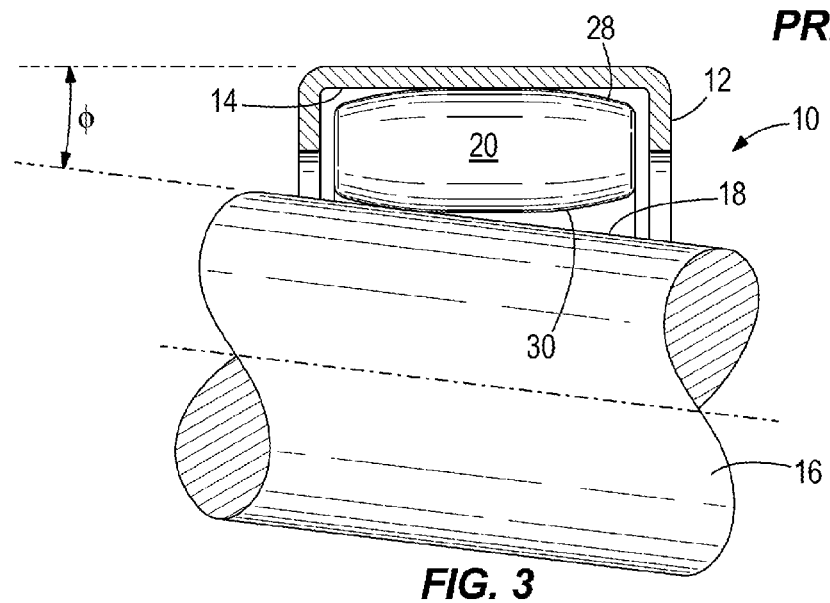
FIG. 3 is a cross-sectional view of the roller hearing assembly of FIG. 1 with a shaft of the roller bearing assembly in a misaligned condition.

With continued reference to FIG. 1, each roller 20 includes a first end 22, a second end 24 opposite the first end, and a center plane 26 bisecting the roller 20. The outer periphery adjacent the ends 22, 24 of the rollers 20 are reduced in diameter to provide raceway contact relief. An interface between the rollers 20 and the outer raceway 14 defines an outer contact profile 28, and an interface between the rollers 20 and the inner raceway 18 defines an inner contact profile 30. In the illustrated embodiment, the contact profiles 28, 30 (which may also be referred to as relief contours) are generally symmetrical about the center plane 26. As illustrated in FIG. 3, the contact profiles 28, 30 reduce end stress and accommodate misalignment of the shaft 16, where the misalignment is defined by a misalignment angle $\Phi$ between the outer raceway 14 and the inner raceway 18.

Figure 2:
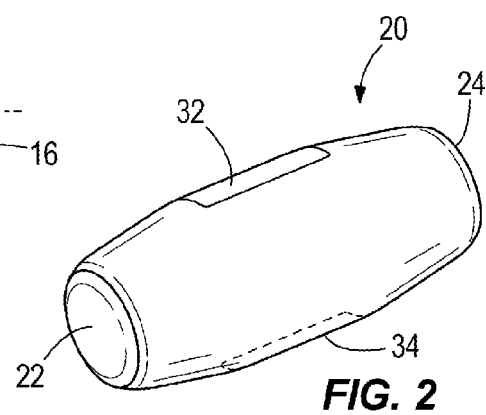
FIG. 2 is a perspective view of a roller of the roller bearing assembly of FIG. 1.
Figure 4:
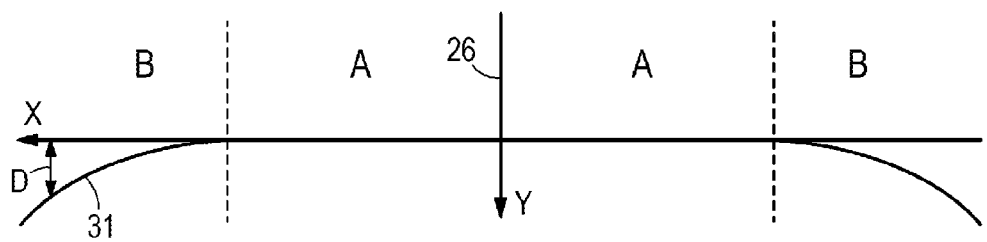
FIG. 4 illustrates a relief contour of the bearing assembly of FIG. 1.

FIG. 4 illustrates a relief contour 31 that is representative of one of the contact profiles 28, 30 when the misalignment angle $\Phi$ is zero. It should be understood that the relief contour 31 of FIG. 4 can represent both the outer contact profile 28 and the inner contact profile 30 because the contact profiles 28, 30 of the bearing assembly 10 are substantially identical. However, in other embodiments the outer and inner contact profiles 28, 30 can have different geometries and define different relief contours. The relief contour 31 defines a relief distance D measured between the rollers 20 and the respective raceways 14, 18. Best illustrated in FIG. 2, the rollers 20 contact the outer raceway 14 over an outer contact area 32 where the relief distance D is zero, and contact the inner raceway 18 over an inner contact area 34 where the relief distance D is zero.

With reference to FIG. 4, the relief contour 31 defines two zones A and B disposed on either side of the center plane 26. Zone A is located closest to the center plane 26, and zone B is located adjacent zone A. In zone A, the relief distance D is zero and remains constant along the length of zone A. In zone B, the relief distance D increases in magnitude with a transverse distance x from the center plane 26.

With continued reference to FIG. 4, the relief contour 31 defines a slope that changes from zone A to zone B. Particularly, the slope of the relief contour 31 is zero and remains constant along the length of zone A, while the slope of the relief contour 31 in zone B progressively increases in magnitude with the transverse distance x from the center plane 26 because the relief contour 31 is curved away from the x-axis. The value of the slope at a particular position along the x-axis can be calculated by taking a first derivative of the curve traced by the relief contour 31. The values of the slope at discrete intervals along the x-axis moving away from the center plane 26 increase in magnitude within zone B. Therefore, the slope of the relief contour 31 is considered to monotonically increase in magnitude with the transverse distance x in both zones A and B. As used herein, the phrase "monotonically increases" means "does not decrease." For example, a function F(x) is considered to monotonically increase if it increases and/or remains constant as x increases.

Figure 5:
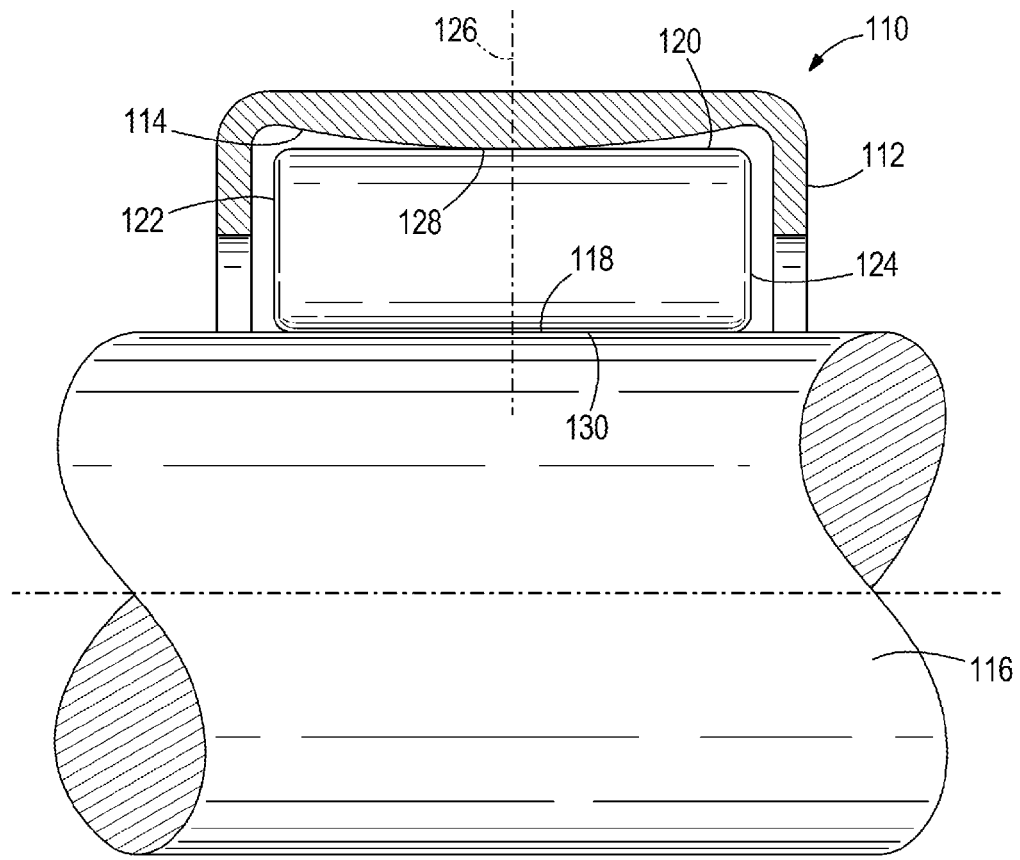
FIG. 5 is a cross-sectional view of a portion of another conventional roller bearing assembly.

FIG. 5 illustrates a portion of another conventional roller bearing assembly 110 that shares many of the same features and properties of the roller bearing assembly 10 described above. Accordingly, features of the roller hearing assembly 110 corresponding with features of the roller bearing assembly 10 are given like reference numerals plus 100, and only differences between the bearing assemblies 10, 110 are described in detail below.

With reference to FIG. 5, the bearing assembly 110 includes an outer raceway 114, a shaft 116 with an inner raceway 118, and rollers 120 disposed between the outer and inner raceways 114, 118. Each of the rollers 120 includes a first end 122, a second end 124 opposite the first end 122, and a center plane 126 bisecting the roller 120. The rollers 120 have a substantially cylindrical shape that cooperates with a convex or crowned contour of the outer raceway 114 to define an outer contact profile 128. An interface between the rollers 120 and the inner raceway 118 defines an inner contact profile 130. In the illustrated embodiment, the contact profiles 128, 130 are symmetrical about the center plane 126.

Figure 6:
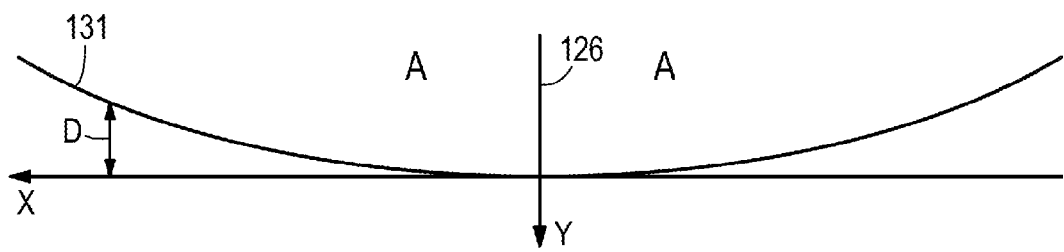
FIG. 6 illustrates a relief contour of the bearing assembly of FIG. 5.

FIG. 6 illustrates a relief contour 131 that is representative of the outer contact profile 128. The relief contour 131 defines a single zone A disposed on either side of the center plane 126. In zone A, the relief distance D increases in magnitude with a transverse distance x from the center plane 126.

With continued reference to FIG. 6, the relief contour 131 defines a slope within zone A that progressively increases in magnitude with the transverse distance x from the center plane 126 because the relief contour 131 is curved away from the x-axis. The value of the slope at a particular position along the x-axis can be calculated by taking a first derivative of the curve traced by the relief contour 131. The values of the slope at discrete intervals along the x-axis moving away from the center plane 126 increase in magnitude within zone A. Therefore, the slope of the relief contour 131 is considered to monotonically increase in magnitude with the transverse distance x from the center plane 126 in zone A.

Figure 7:
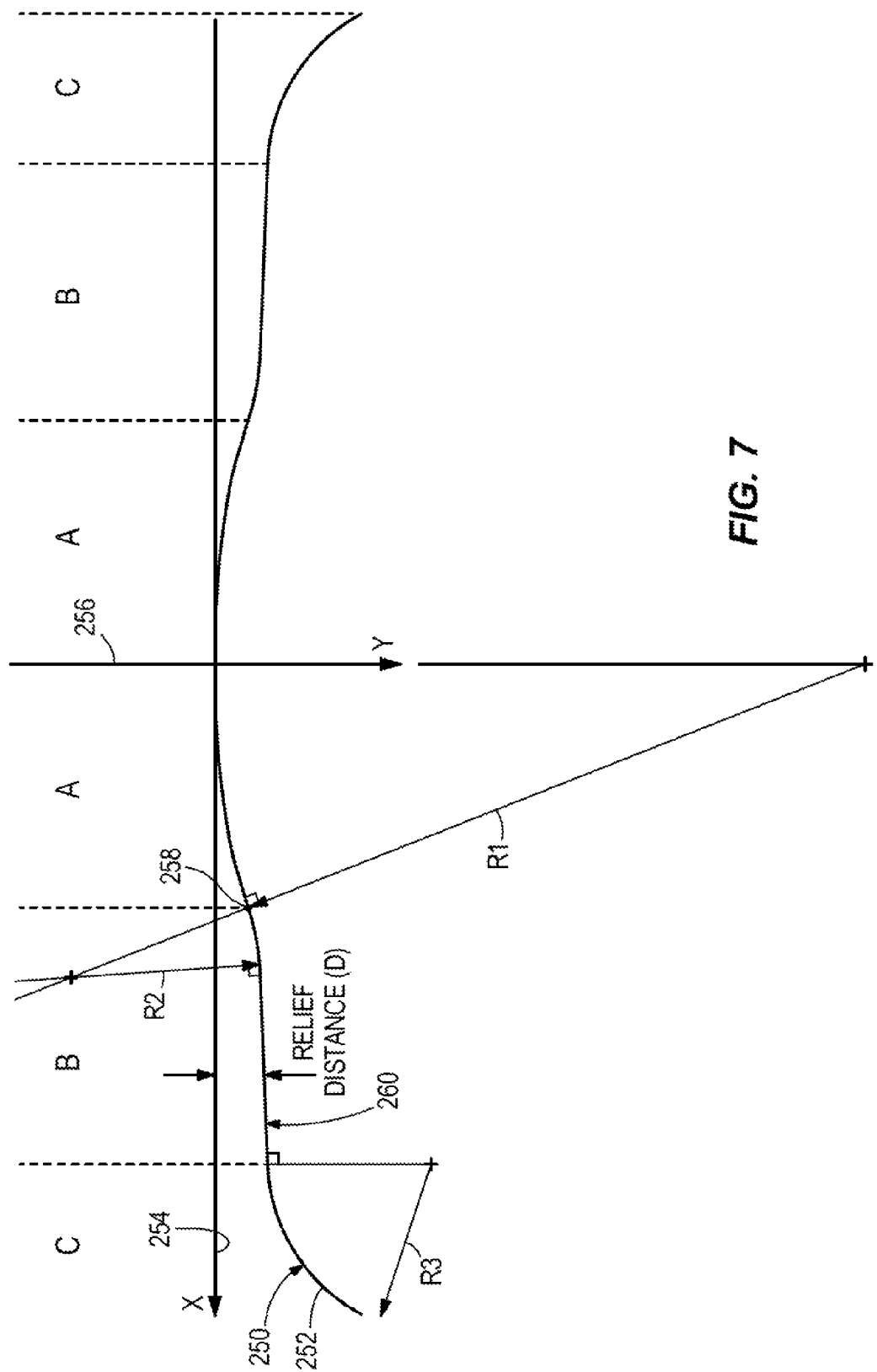
FIG. 7 illustrates a relief contour according to an embodiment of the invention.

FIG. 7 illustrates a relief contour 250 for a roller bearing assembly according to an embodiment of the invention. The relief contour 250 is enlarged and dramatized to illustrate its geometry. The relief contour 250 can be applied to any type of roller bearing assembly, such as the roller bearing assemblies 10 and 110 described above, other cylindrical roller bearing assemblies, tapered roller bearing assemblies, needle roller bearing assemblies, and the like. In the illustrated embodiment, the relief contour 250 is shown as a contoured surface 252 in contact with a non-contoured (i.e., straight) surface 254. In some embodiments, the non-contoured surface 254 can be a raceway (or a journaled portion of a shaft), and the contoured surface 252 can be an outer surface of a roller. In other embodiments, the non-contoured surface 254 can be the outer surface of the roller, and the contoured surface 252 can be the raceway. Alternatively, both surfaces 252, 254 can be contoured in any manner such that a combination of the two surfaces 252, 254 yields an effective contact profile equivalent to the illustrated relief contour 250.

In the illustrated embodiment, the relief contour 250 is symmetrical about a center plane 256. The relief contour 250 defines a relief distance D measured between the contoured surface 252 and the non-contoured surface 254, and the relief contour 250 includes three zones, A, B, and C disposed on either side of the center plane 256. Zone A is closest to the center plane 256, zone B is located adjacent zone A, and zone C is located adjacent zone B and farthest from the center plane 256. In the illustrated embodiment, the relief contour 250 has at least tangent continuity (also known as $G^1$ or first derivative continuity) such that transitions between zones A, B, and C are generally smooth.

With continued reference to FIG. 7, in zones A, B, and C, the relief distance D increases in magnitude with a transverse distance x moving in a direction away from the center plane 256. In some embodiments, the relief distance D may remain substantially constant with the distance x in zone B. In other embodiments, the relief distance D may decrease in magnitude with the distance x in zone B.

The relief contour 250 defines a slope that, in zone A, monotonically increases in magnitude with the transverse distance x from the center plane 256. Along at least a portion of zone B adjacent zone A, the slope progressively decreases in magnitude with the transverse distance x from the center plane 256, while the slope remains substantially constant in the remainder of zone B. In the illustrated embodiment, the magnitude of the slope in zone B is less than the maximum value of the magnitude of the slope in zone A. In zone C, the slope again monotonically increases in magnitude with the transverse distance x from the center plane 256. In the illustrated embodiment, the slope increases in magnitude with the transverse distance x from the center plane 256 at a greater rate in zone C than in zone A. This provides an aggressive raceway contact relief to reduce end stresses.

The value of the slope at a particular position along the x-axis, within any of zones A, B, or C, can be calculated by taking a first derivative of the curve traced by the relief contour 250. "Concavity" is another characteristic of the curve traced by the relief contour 250 which can be determined by taking a second derivative of the curve traced by the relief contour 250. If the value of the second derivative at a particular value of x is positive, then the curve traced by the relief contour 250 is considered to be "concave up" at that x-value, while if the value of the second derivative at a particular value of x is negative, then the curve traced by the relief contour 250 is considered to be "concave down" at that x-value. An "inflection region" may be defined on the curve where the concavity switches from concave up to concave down, or vice-versa. The value of the second derivative at a particular value of x changes sign on either side of the inflection region, and the value of the second derivative is zero within the inflection region. In some embodiments, the inflection region can be a single point or "inflection point" where the value of the second derivative is zero. In other embodiments, the inflection region can be a linear region or line segment having a number of points where the value of the second derivative is zero.

With reference to FIG. 7, the concavity of the curve traced by the relief contour 250 changes at a first inflection region 258 that transitions between zones A and B. In the illustrated embodiment, the first inflection region 258 is an inflection point; however, in other embodiments, the first inflection region 258 may be a line segment depending on the particular geometry of the relief contour 250. Adjacent the first inflection region 258 in zone A, the second derivative of the curve traced by the relief contour 250 is positive, thereby indicating that the curve at this location is concave up. Similarly, adjacent the inflection region 258 in zone B, the second derivative of the curve traced by the relief contour 250 is negative, thereby indicating that the curve at this location is concave down. This change in concavity of the curve traced by the relief contour 250 at the inflection region 258 coincides with the reduction in the magnitude of the slope of the relief contour 250 from zone A to zone B. As such, the change of the relief distance D within zone B is less than that within zone A.

In the illustrated embodiment, the concavity of the curve traced by the relief contour 250 changes again at a second inflection region 260 that transitions between zones B and C. In the illustrated embodiment, the inflection region 260 is a line segment; however, in other embodiments, the inflection region 260 may be a single inflection point depending on the particular geometry of the relief contour 250. Adjacent the inflection region 260 in zone B, the second derivative of the curve traced by the relief contour 250 is negative, thereby indicating that the curve at this location is concave down. Similarly, adjacent the inflection region 260 in zone C, the second derivative of the curve traced by the relief contour 250 is positive, thereby indicating that the curve at this location is concave up. This change in concavity of the curve traced by the relief contour 250 at the inflection region 260 coincides with the increase in the magnitude of the slope of the relief contour 250 from zone B to zone C. As such the change of the relief distance D within zone (is greater than that within zone B.

With continued reference to FIG. 7, each of the zones A, B, and C has a radius of curvature R1, R2, and R3, respectively. In the illustrated embodiment, zone A has the largest radius of curvature R1, zone C has the smallest radius of curvature R3, and zone B has a radius of curvature R2 between that of zones A and C. Accordingly, the relief contour 250 is a multi-radius contact profile.

During ordinary operation (at relatively light loads) of a roller bearing assembly including the relief contour 250 of FIG. 7, the contact area between the rollers and an associated one of the inner and outer raceways is limited within zone A. The geometry of zone A minimizes contact area length in a direction transverse to the rolling direction of the bearing assembly to minimize power loss. This provides high efficiency during ordinary operation of the bearing assembly. As a dynamic load applied to the bearing assembly increases, the contact area spreads in the direction x, towards zone C. Because the slope of the relief contour 250 decreases in zone B, the contact area is able to spread more quickly along zone B as the dynamic load increases. This allows for a greater contact area, reducing the contact stress on the rollers, raceways, and/or shaft and thereby increasing the durability of the bearing assembly. If the dynamic load further increases to extend the contact area into zone C, the aggressive increase in relief in zone C prevents excessive edge stresses.

Thus, the present invention provides a multi-radius contact profile for a roller bearing assembly that reduces power loss while maintaining the durability of the bearing assembly. The shape of the relief contour 250 according to the present invention is beneficial to bearings using tapered (conical rollers), cylindrical rollers, and spherical rollers.

Although the invention has been described in detail with reference to certain preferred embodiments, variations and modifications exist within the scope and spirit of one or more independent aspects of the invention as described.

Various features of the invention are set forth in the following claims.

What is claimed is:

1. A roller bearing comprising:
   a raceway; and
   a roller defining a center plane that bisects the roller, the roller being in contact with the raceway at a point on the center plane;
   wherein the raceway and the roller are configured to define a relief contour therebetween, the relief contour defining a slope along its length,
   wherein the slope of the relief contour defines at least one inflection region, and
   wherein a relief distance measured between the roller and the raceway does not decrease in magnitude along a transverse direction away from the center plane.

2. The roller bearing of claim 1, wherein the relief contour includes
   a first zone in which the slope increases in magnitude along a length of the first zone, and
   a second zone adjacent the first zone in which the slope decreases in magnitude along at least a portion of a length of the second zone such that the inflection region is defined between the first zone and the second zone.

3. The roller bearing of claim 2, wherein the relief contour further includes a third zone adjacent the second zone in which the slope increases in magnitude along a length of the third zone.

4. The roller bearing of claim 2, wherein the slope in the first zone increases in magnitude along the transverse direction away from the center plane.

5. The roller bearing of claim 4, wherein the slope in the second zone decreases in magnitude along the transverse direction from the center plane.

6. The roller bearing of claim 5, wherein the relief contour further includes a third zone adjacent the second zone in which the slope increases in magnitude along the transverse direction from the center plane.

7. The roller bearing of claim 2, wherein the relief contour has a first radius of curvature in the first zone and a second radius of curvature in the second zone that is different than the first radius of curvature.

8. The roller bearing of claim 7, wherein the second radius of curvature is less than the first radius of curvature.

9. The roller bearing of claim 1, wherein the roller is engageable with the raceway over a contact area intersecting the center plane, and wherein the contact area increases as a load applied to the bearing increases.

10. The roller bearing of claim 1, wherein the relief contour changes concavity within the inflection region.

11. The roller bearing of claim 1, wherein the relief contour has at least tangent continuity.

* * * * *